(12) United States Patent
Baek et al.

(10) Patent No.: US 8,199,268 B2
(45) Date of Patent: Jun. 12, 2012

(54) DISPLAY PANEL AND MANUFACTURING METHOD OF THE SAME

(75) Inventors: Seung-Soo Baek, Seoul (KR); Seong-Young Lee, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 431 days.

(21) Appl. No.: 12/432,110

(22) Filed: Apr. 29, 2009

(65) Prior Publication Data

US 2010/0007841 A1  Jan. 14, 2010

(30) Foreign Application Priority Data

Jul. 9, 2008  (KR) .................. 10-2008-0066667

(51) Int. Cl.
*G02F 1/1333* (2006.01)
*G02F 1/1345* (2006.01)

(52) U.S. Cl. .......................... 349/40; 349/151
(58) Field of Classification Search .......... 349/149–152, 349/40

See application file for complete search history.

(56) References Cited

U.S. PATENT DOCUMENTS

| 7,027,123 B2* | 4/2006 | Chae et al. ............ 349/192 |
| 7,710,534 B2* | 5/2010 | Byun et al. ............ 349/189 |
| 2005/0151919 A1* | 7/2005 | Lee et al. ............ 349/153 |
| 2006/0197899 A1* | 9/2006 | Kamiya et al. ............ 349/124 |

* cited by examiner

*Primary Examiner* — Mark Robinson
*Assistant Examiner* — Charles Chang
(74) *Attorney, Agent, or Firm* — F. Chau & Associates, LLC

(57) ABSTRACT

A method of manufacturing a display panel includes forming a first display substrate including a plurality of pixel electrodes, a plurality of test signal lines, and a plurality of test pads, forming a second display substrate including a common electrode, forming a short point at a position corresponding to the test pads, dividing the second display substrate into a plurality of regions insulated from each other, aligning and attaching the first display substrate and the second display substrate to each other, removing an edge portion of the first display substrate to expose an edge portion of the second display substrate, and applying a voltage to the first display substrate and the second display substrate through a voltage application portion of the exposed edge portion of the second display substrate.

7 Claims, 11 Drawing Sheets

FIG.8
(a)
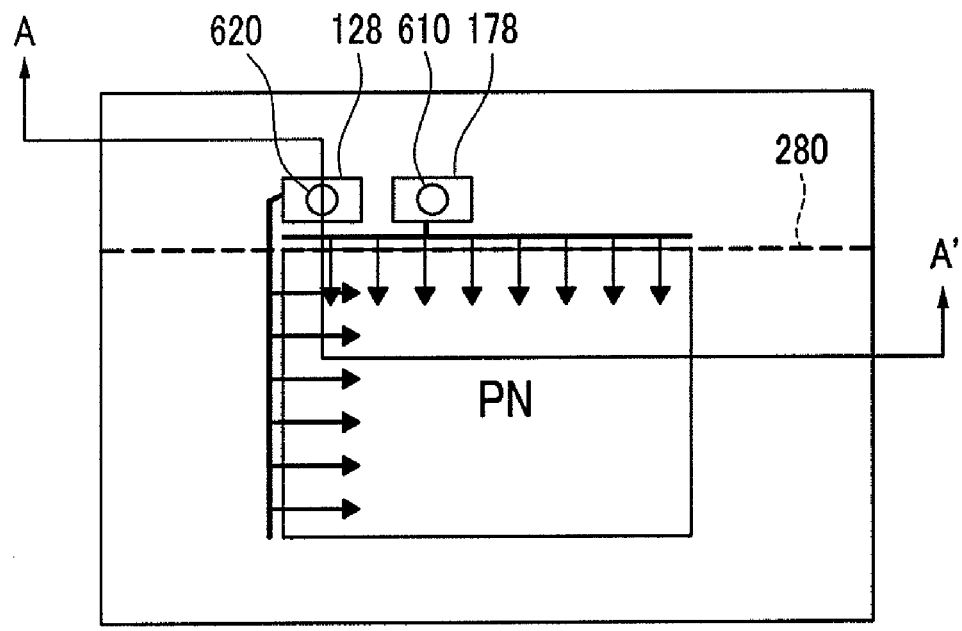
(b)
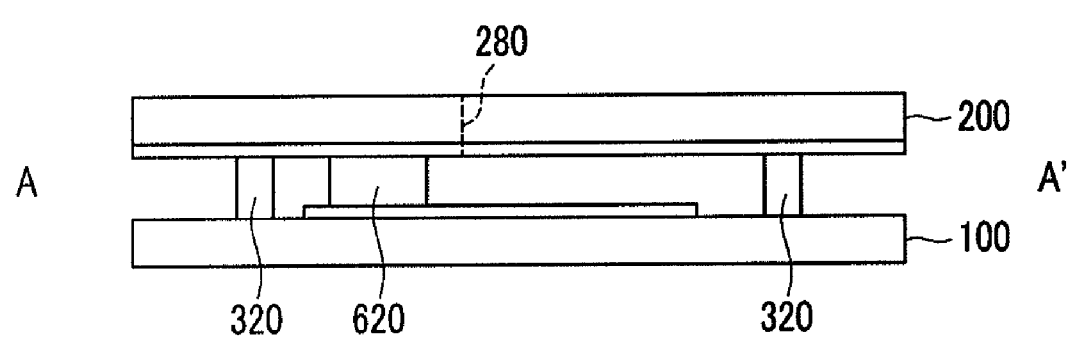

FIG.9
(a)
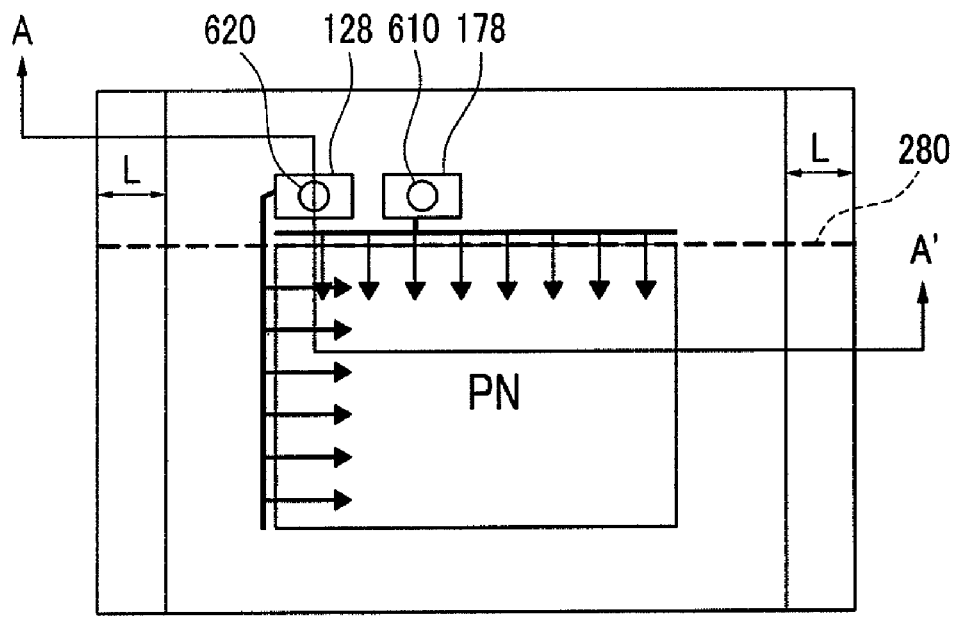
(b)
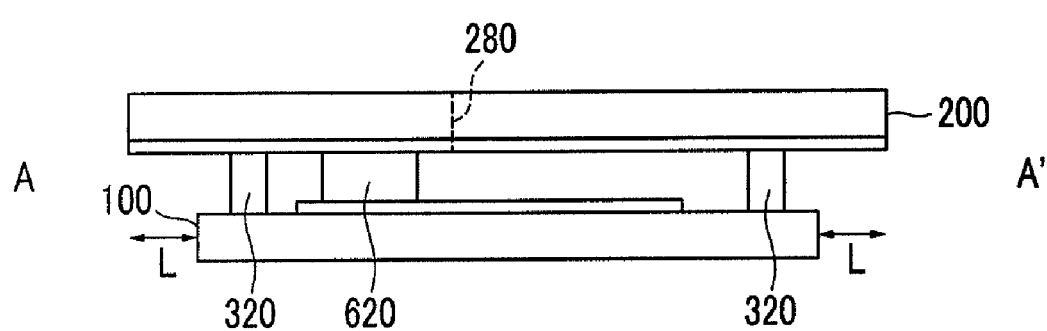

DISPLAY PANEL AND MANUFACTURING METHOD OF THE SAME

CROSS-REFERENCE TO RELATED APPLICATION

This application claims priority to Korean Patent Application No. 10-2008-0066667 filed on Jul. 9, 2008, the entire contents of which are incorporated herein by reference.

BACKGROUND OF THE INVENTION (a) Technical Field

The present disclosure relates to a display panel and a manufacturing method thereof, and more particularly, to a display panel for a liquid crystal display and a manufacturing method thereof.

(b) Discussion of the Related Art

A liquid crystal display (LCD) is a flat panel display. The LCD includes two substrates with electrodes formed thereon and a liquid crystal layer interposed between the two substrates. In the LCD, a voltage is applied to the electrodes to realign liquid crystal molecules of the liquid crystal layer to thereby regulate the transmittance of light passing through the liquid crystal layer.

To increase a response speed of the liquid crystal display, various initial aligning methods for the liquid crystal molecules have been proposed for providing a pretilt to the liquid crystal molecules. In an initial alignment method, when a prepolymer is exposed to ultraviolet rays to provide the pretilt to liquid crystal molecules, each field generating electrode is applied with a voltage having a desired magnitude before the ultraviolet ray exposure.

In a method of manufacturing a liquid crystal display, a thin film pattern of a multi-layered structure is formed on a mother glass. The mother glass includes a plurality of cells formed using a deposition process and a photolithography process. The mother glass is divided into the plurality of cells.

However, in the method of manufacturing the liquid crystal display, applying the voltage in the initial alignment step of the liquid crystal molecule is a time consuming process because each cell of the divided liquid crystal display must be applied with the voltage and must be exposed.

SUMMARY OF THE INVENTION

In an exemplary embodiment of the present invention, a voltage is applied for a unit of the mother glass including a plurality of cells. Thus, a manufacturing process can be simplified.

According to an exemplary embodiment of the present invention, a method of manufacturing a display panel includes forming a first display substrate including a plurality of pixel electrodes, a plurality of test signal lines, and a plurality of test pads, forming a second display substrate including a common electrode, forming a short point at a position corresponding to the test pads, dividing the second display substrate into a plurality of regions insulated from each other, aligning and attaching the first display substrate and the second display substrate to each other, removing an edge portion of the first display substrate to expose an edge portion of the second display substrate, and applying a voltage to the first display substrate and the second display substrate through a voltage application portion of the exposed edge portion of the second display substrate.

The short point electrically may connect the first display substrate and the second display substrate to each other, and the short point can be formed in the first display substrate.

The short point electrically may connect the first display substrate and the second display substrate to each other, and the short point can be formed in the second display substrate.

Dividing the second display substrate into a plurality of regions insulated from each other may include dividing the common electrode into a plurality of electrodes insulated from each other.

Dividing the second display substrate into a plurality of regions insulated from each other may use a laser.

Dividing the second display substrate into a plurality of regions insulated from each other may use a laser.

The voltage application portion may include a plurality of voltage application portions disposed in the plurality of regions of the second display substrate.

The voltage applied through at least one of the voltage application portions can be applied to the short point through the common electrode of the second display substrate.

The voltage applied to the short point can be applied to the test signal line through the test pad.

The voltage applied through at least one of the voltage application portions can be applied only to the common electrode of the second display substrate.

The voltage applied through at least one of the voltage application portions can be applied only to the common electrode of the second display substrate.

The voltage applied through at least one of the voltage application portions can be applied only to the common electrode of the second display substrate.

According to an exemplary embodiment of the present invention, a display panel comprises a first display substrate including a plurality of pixel electrodes, a plurality of test signal lines, and a plurality of test pads, a second display substrate including a common electrode, and wherein the second display panel is divided into a plurality of regions insulated from each other, and a short point formed on the test pads, wherein an edge portion of the first display substrate is removed to expose a corresponding edge of the second display substrate.

The short point electrically may connect the first display substrate and the second display substrate to each other, and the short point can be formed in the first display substrate.

The short point electrically may connect the first display substrate and the second display substrate to each other, and the short point is formed in the second display substrate.

The display panel may further comprise a plurality of voltage application portions formed on the exposed edge of the second display substrate, wherein the plurality of voltage application portions are respectively disposed in the plurality of regions of the second display substrate.

A voltage applied through at least one of the voltage application portions can be applied to the short point through the common electrode of the second display substrate, the voltage applied to the short point can be applied to a test signal line through a test pad, and the voltage applied to the test signal line can be applied to a pixel electrode.

A voltage applied through at least one of the voltage application portions can be applied only to the common electrode of the second display substrate.

The voltage applied through at least one of the voltage application portions can be applied only to the common electrode of the second display substrate.

The plurality of regions of the second display substrate can be divided by a laser.

According to an exemplary embodiment of the present invention, a display panel used in a liquid crystal display (LCD) device includes a thin film transistor array panel, a common electrode panel formed opposite the thin film transistor array panel, at least one region division line formed in the common electrode panel dividing the common electrode panel, a short point electrically connecting the thin film transistor array panel and the common electrode panel, and a voltage application portion formed on the common electrode panel and not formed on the thin film transistor array panel, wherein the at least one region division line insulates portions of the common electrode panel.

BRIEF DESCRIPTION OF THE DRAWINGS

Exemplary embodiments of the present invention can be understood in more detail from the following descriptions taken in conjunction with the accompanying drawings, in which:

FIG. 6 to FIG. 10 are views sequentially showing a method of manufacturing a display panel according to an exemplary embodiment of the present invention.

DETAILED DESCRIPTION OF EXEMPLARY EMBODIMENTS

The present invention will be described more fully hereinafter with reference to the accompanying drawings, in which exemplary embodiments of the invention are shown. This invention may, however, be embodied in many different forms and should not be construed as limited to the exemplary embodiments set forth herein.

It will be understood that when an element such as a layer, film, region, or substrate is referred to as being "on" another element, it can be directly on the other element or intervening elements may also be present.

A display panel according to an exemplary embodiment of the present invention is described with reference to accompanying drawings.

Figure 1:
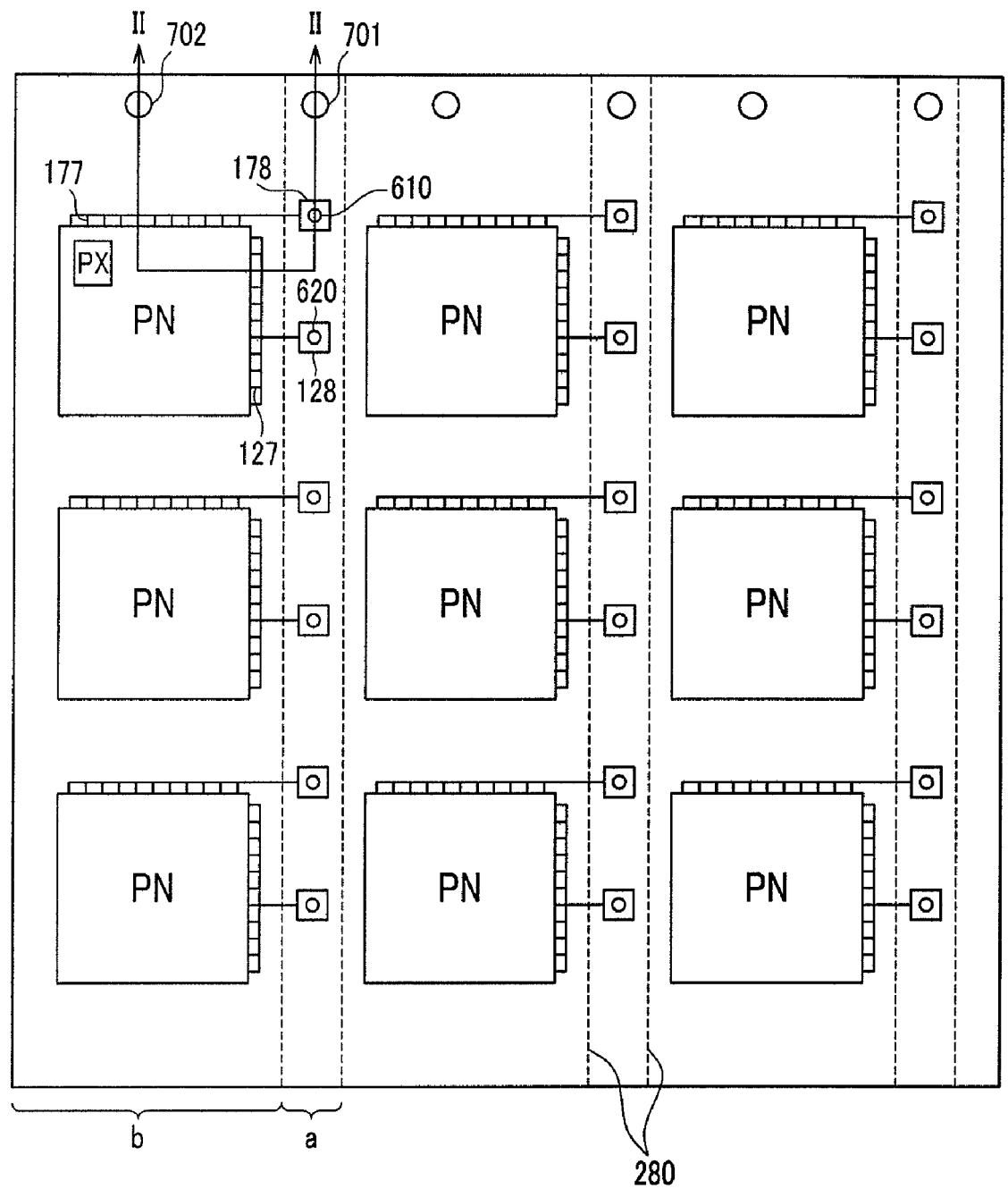
FIG. 1 is a top plan view of a display panel according to an exemplary embodiment of the present invention.
Figure 2:
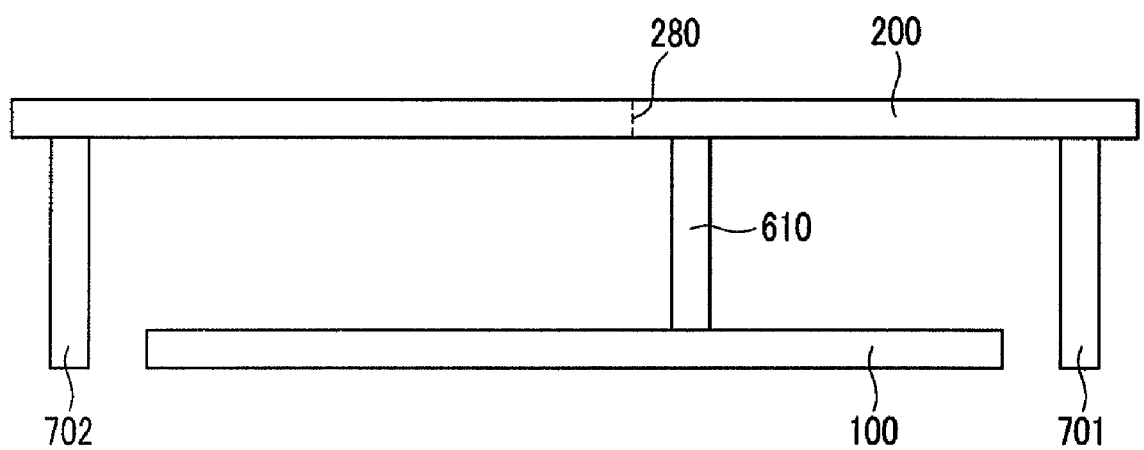
FIG. 2 is a cross-sectional view of the display panel taken along the ling II-II in FIG. 1 according to an exemplary embodiment of the present invention.

FIG. 1 is a top plan view of a display panel according to an exemplary embodiment of the present invention. FIG. 2 is a cross-sectional view of the display panel taken along the ling II-II in FIG. 1.

Referring to FIG. 1 and FIG. 2, a display panel comprising one mother glass includes a plurality of liquid crystal panels PN for a liquid crystal display. The display panel can be formed using an assembly process of substrates. For example, referring to FIG. 1, nine liquid crystal panels PN are formed in the display panel. Each liquid crystal panel PN includes a plurality of pixels PX.

Referring to FIG. 1 and FIG. 2, the display panel in which a plurality of thin films are formed includes a thin film transistor (TFT) array substrate 100 and a common electrode substrate 200 facing each other. A plurality of voltage application portions 701 and 702 are formed on an upper edge of the display panel. A pin or a probe for a voltage application contacts the voltage application portions 701 and 702.

The display panel is divided into a plurality of regions by a plurality of region division lines 280. The region division lines 280 may be formed by, for example, laser. The region division lines 280 are formed in the common electrode substrate 200. Electrodes formed by regions on the common electrode substrate 200 are insulated from each other.

The voltage application portions 701 and 702 may be disposed on the common electrode substrate 200. The edge portion of the thin film transistor array substrate 100 corresponding to the region where the plurality of voltage application portions 701 and 702 are disposed is removed. The common electrode substrate 200 where the voltage application portions 701 and 702 are disposed is exposed.

A plurality of test signal lines 127 and 177 respectively connected to gate lines and data lines of each pixel are formed in each liquid crystal panel PN. The test signal lines 127 and 177 are connected to test pads 128 and 178. The test signal lines 127 and 177 and the test pads 128 and 178 may be used for a signal line test for determining whether a voltage is applied to the signal lines without a defect after completing a liquid crystal display including a liquid crystal panel.

Short points 620 and 610 are formed on the test pads 128 and 178 such that the two display substrates 100 and 200 are electrically connected to each other. The short points 620 and 610 may be formed on one of the thin film transistor array substrate 100 and the common electrode substrate 200.

The voltage applied to the voltage application portions 701 is passed through the common electrode substrate 200 and is applied to the thin film transistor array substrate 100 through the short points 620 and 610 formed on the test pads 128 and 178. The voltage applied to the voltage application portion 702 is applied only to the common electrode substrate 200. The common electrode substrate 200 is divided into a plurality of regions that are electrically insulated from each other by the region division lines 280. Thus, the voltages applied to the voltage application portions 701 and 702 are respectively applied to the regions a and b. The regions a and b are insulated from each other.

A structure of a pixel of the liquid crystal panel PN according to an exemplary embodiment of the present invention is described with reference to FIG. 3 and FIG. 4.

Figure 3:
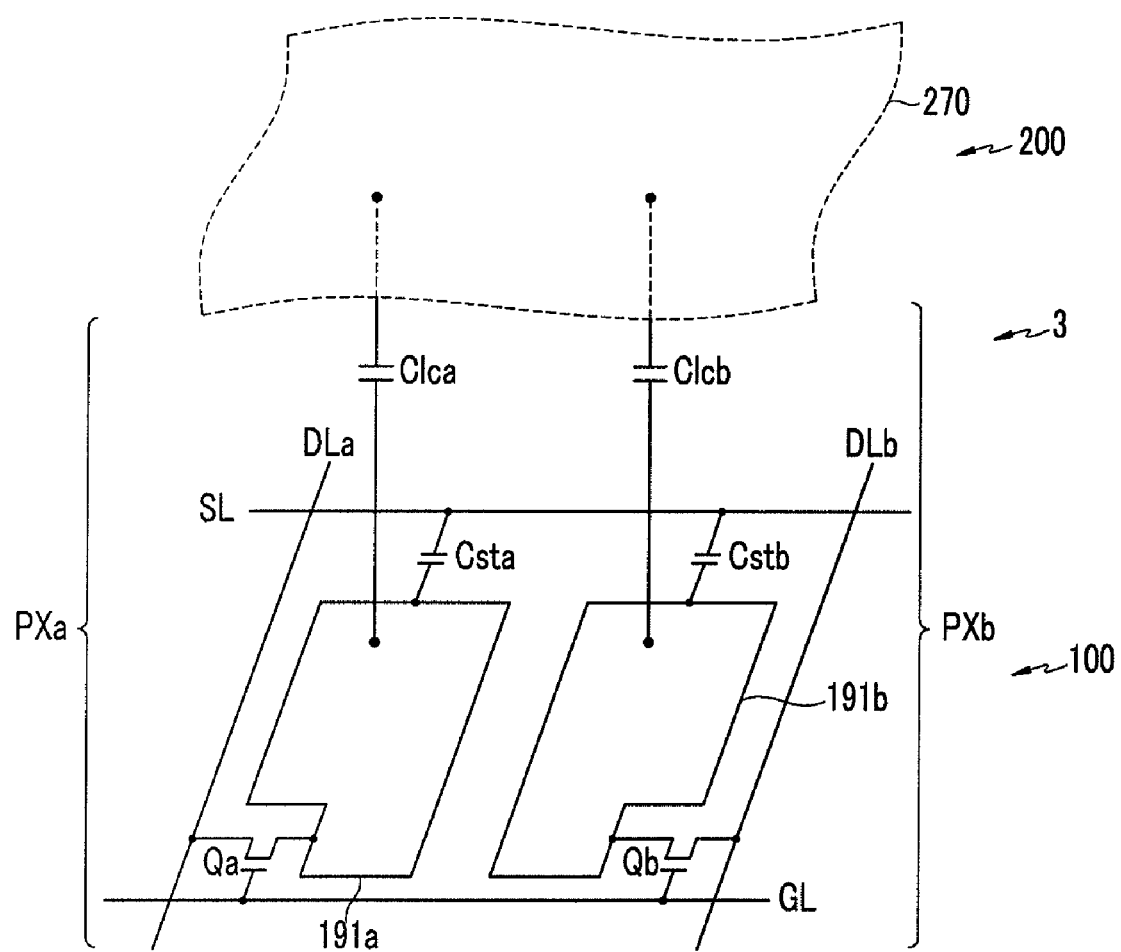
FIG. 3 is an equivalent circuit diagram of a pixel in a liquid crystal panel according to an exemplary embodiment of the present invention.

FIG. 3 is an equivalent circuit diagram of a pixel in a liquid crystal panel according to an exemplary embodiment of the present invention. FIG. 4 is a layout view of a pixel in a liquid crystal panel according to an exemplary embodiment of the present invention.

Referring to FIG. 3, a liquid crystal panel includes signal lines. The signal lines include a plurality of gate lines GL, a plurality of pairs of data lines DLa and DLb, and a plurality of storage electrode lines SL, and a plurality of pixels PX connected to the signal lines. The liquid crystal panel includes a lower substrate 100 and an upper substrate 200 facing each other, and a liquid crystal layer 3 interposed therebetween.

Each pixel PX includes a pair of subpixels PXa and PXb. Each subpixel PXa/PXb has a switching element Qa/Qb, a liquid crystal capacitor Clca/Clcb, and a storage capacitor Csta/Cstb.

Each switching element Qa/Qb is a three-terminal element such as a thin film transistor provided on a lower substrate 100. The three-terminal element may include a control terminal connected to the gate line GL, an input terminal connected to the data line DLa/DLb, and an output terminal connected to the liquid crystal capacitor Clca/Clcb and the storage capacitor Csta/Cstb.

The liquid crystal capacitor Clca/Clcb uses a subpixel electrode and a common electrode 270 as two terminals. The liquid crystal layer 3 between the electrodes 191a/191b and 270 functions as a dielectric material.

The storage capacitor Csta/Cstb serving as an assistant to the liquid crystal capacitor Clca/Clcb is formed by a storage electrode line SL provided on the lower display substrate 100 that overlaps the subpixel electrodes 191a/191b, with an insulator interposed between the subpixel electrodes 191a/191b and the storage electrode line SL. A predetermined voltage such as the common voltage Vcom is applied to the storage capacitor Csta/Cstb.

A predetermined difference is generated between the voltages charged to two liquid crystal capacitors Clca and Clcb. For example, the data voltage applied to the liquid crystal capacitor Clca is less or more than the data voltage applied to the liquid crystal capacitor Clcb. Therefore, when the voltages of the first and second liquid crystal capacitors Clca and Clcb are adjusted, an image viewed from the side can be substantially similar to an image viewed from the front. Therefore, the side visibility can be improved.

The liquid crystal panel includes the lower substrate 100 and the upper substrate 200 facing each other, and the liquid crystal layer 3 formed therebetween.

A thin film transistor array substrate 100 is described with reference to FIG. 4.

A plurality of gate lines 121 and a plurality of storage electrode lines 131 and 135 are formed on an insulating substrate.

The gate lines 121 transmit gate signals and extend in a transverse direction, and each gate line 121 includes a plurality of first and second gate electrodes 124a and 124b protruding upwardly. The storage electrode lines 131 include a stem extending substantially parallel to the gate lines 121, and a plurality of storage electrodes 133 extended from the stem.

A gate insulating layer is formed on the gate lines 121 and the storage electrode lines 131 and 133. A plurality of semiconductors 154a and 154b comprising, for example, amorphous or crystallized silicon are formed on the gate insulating layer.

A plurality of pairs of ohmic contacts are formed on the semiconductors 154a and 154b. The ohmic contacts may comprise, for example, n+ hydrogenated amorphous silicon in which an n-type impurity is doped with a high concentration. The ohmic contacts may comprise silicide.

A plurality pairs of data lines 171a and 171b and a plurality of first and second drain electrodes 175a and 175b are formed on the ohmic contacts and on the gate insulating layer.

The data lines 171a and 171b transmit data signals, extend substantially in the longitudinal direction, and cross the gate lines 121 and the stem of the storage electrode lines 131. Each data line 171a and 171b includes a plurality of first and second source electrodes 173a and 173b extending toward the first and second gate electrodes 124a and 124b and curved with a substantially "U" shape. The first and second source electrodes 173a and 173b are opposite to the first and second drain electrodes 175a and 175b with respect to the first and second gate electrodes 124a and 124b.

A first gate electrode and a second gate electrode 124a and 124b, a first source electrode and a second source electrode 173a and 173b, and a first drain electrode and a second drain electrode 175a and 175b respectively form a first thin film transistor and a second thin film transistor (TFT) Qa/Qb along with a first semiconductor and a second semiconductor 154a/154b. A channel of the first thin film transistor and the second thin film transistor Qa/Qb is formed on the first semiconductor and the second semiconductor 154a/154b between the first source electrode and the second source electrode 173a/173b and the first drain electrode and the second drain electrode 175a/175b.

A lower passivation layer comprising, for example, silicon nitride or silicon oxide is formed on the data lines 171a and 171b, the drain electrodes 175a and 175b, and the exposed portions of the semiconductors 154a and 154b. A plurality of light blocking members 220 referred to as a black matrix and separated by a predetermined interval from each other are formed on the lower passivation layer 180p. A plurality of color filters 230 are formed on the lower passivation layer 180p and the light blocking members 220. The color filters 230 are formed in a region surrounded by the light blocking members 220. The color filters 230 have a plurality of holes 235a and 235b disposed on the first and second drain electrodes 175a and 175b. The color filters 230 have a plurality of openings 233 disposed on the storage electrode 133. The opening 233 reduces the thickness of the dielectric material forming the storage capacitors Csta and Cstb such that the storage capacitance may be increased. An upper passivation layer is formed on the light blocking member 220 and the color filters. A plurality of pixel electrodes 191 are formed on the upper passivation layer.

Each pixel electrode 191 includes first and second subpixel electrodes 191a and 191b that are separated from each other with a gap 91 of a substantially quadrangular belt shape therebetween.

In an exemplary embodiment, the shape of the first and second subpixel electrodes 191a and 191b is a quadrangle. The shape of the first and second subpixel electrodes 191a and 191b includes a cross-shaped stem having a transverse stem and a longitudinal stem that are crossed. Each pixel electrode is divided into four sub-regions by a transverse stem and a longitudinal stem. Each of the sub-regions includes a plurality of first to fourth minute branches.

In an exemplary embodiment, among the four minute branches, the first minute branch obliquely extends from the transverse stem or the longitudinal stem in the upper-left direction. The second minute branch obliquely extends from the transverse stem or the longitudinal stem in the upper-right direction. The third minute branch obliquely extends from the transverse stem or the longitudinal stem in the lower-left direction. The fourth minute branch obliquely extends from the transverse stem or the longitudinal stem in the lower-right direction.

Each of minute branches forms an angle of about 45 degrees or about 135 degrees with respect to the gate lines 121 or the transverse stem. The minute branches of two neighboring sub-regions may be crossed.

In an exemplary embodiment, the width of the minute branches may become wider close to the transverse stem or the longitudinal stem.

Figure 4:
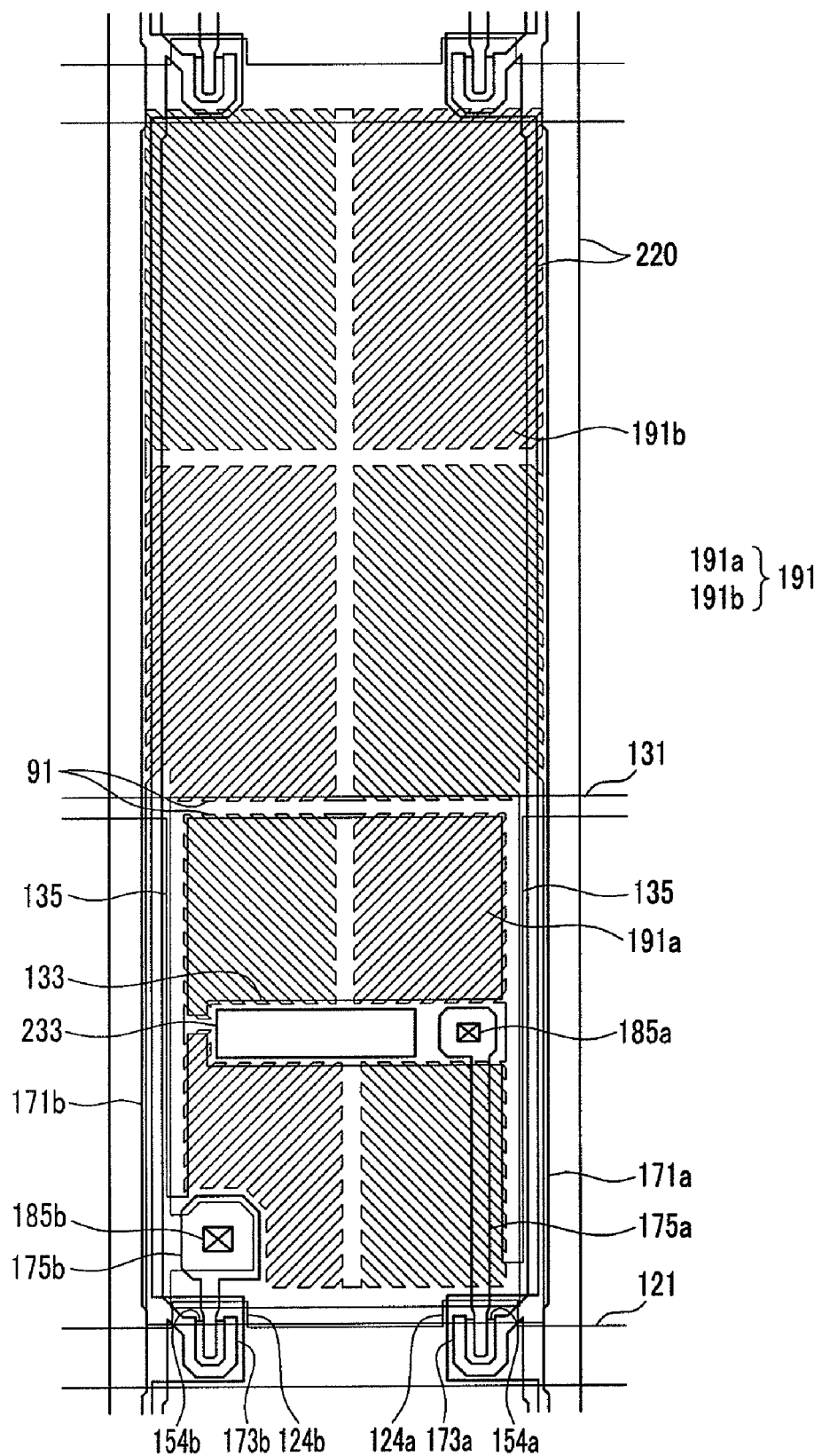
FIG. 4 is a layout view of a pixel in a liquid crystal panel according to an exemplary embodiment of the present invention.

Referring to FIG. 4, the area occupied by the second subpixel electrode 191b may be larger than the area occupied by the first subpixel electrode 191a in the whole pixel electrode 191. In an exemplary embodiment, the area of the second subpixel electrode 191b may be larger about 1.0 to about 2.2 times than the area of the first subpixel electrode 191a. Each of the first subpixel electrode and the second subpixel electrode 191a and 191b is physically and electrically connected to the first drain electrode and the second drain electrode 175a and 175b through the contact hole 185a and 185b. Each of the first subpixel electrode and the second subpixel electrode 191a and 191b receives data voltages from the first drain electrode and the second drain electrode 175a and 175b.

An alignment layer is formed on the pixel electrodes 191.

In the common electrode substrate 200 according to an exemplary embodiment of the present invention, a common electrode is formed on an insulating substrate, and an alignment layer is formed thereon. The common electrode can be formed on the whole surface of the insulating substrate.

In an exemplary embodiment, each of the alignment layers may be a vertical alignment layer.

The liquid crystal layer interposed between the thin film transistor array substrate and the common electrode substrate includes liquid crystal molecules having negative dielectric anisotropy.

When the gate lines 121 are applied with the gate signals, the data voltage is applied to the first and second subpixel electrodes 191a and 191b through the data lines 171a and 171b. Then, the first and second subpixel electrodes 191a and 191b applied with the data voltage and the common electrode 270 applied with the common voltage generate an electric field to the liquid crystal layer. In an exemplary embodiment, the edges of the minute branches distort the electric field to generate the horizontal components perpendicular to the edges of the minute branches. The inclination direction of the liquid crystal molecules is determined by the horizontal components. The liquid crystal molecules tilt in a direction perpendicular to the edges of the minute branches. However, the directions of the horizontal components of the electric field generated by the neighboring minute branches are opposite to each other, and the intervals between the minute branches are narrow such that the liquid crystal molecules arranged in the opposite directions are tilted in the direction parallel to the length direction of the minute branches.

In an exemplary embodiment of the present invention, the length directions, where the minute branches are extended in a pixel PX, are four directions such that the inclined directions of the liquid crystal molecules are the four directions. Therefore, the viewing angle of the liquid crystal display is widened by varying the inclined directions of the liquid crystal molecules.

The first subpixel electrode 191a and the second subpixel electrode 191b are applied with different data voltages through the different data lines 171a and 171b. The voltage of the first subpixel electrode 191a having a relatively smaller area is higher than the voltage of the second subpixel electrode 191b having a relatively larger area.

In an exemplary embodiment, when the voltages of the first sub-pixel electrode 191a and the second sub-pixel electrode 191b are different from each other, the voltage applied to the first liquid crystal capacitor Clca formed between the first sub-pixel electrode 191a and the common electrode 270 and the voltage applied to the second liquid crystal capacitor Clcb formed between the second sub-pixel electrode 191b and the common electrode 270 are different from each other. Thus, the declination angle of the liquid crystal molecules of the subpixels PXa and PXb are different from each other. When the voltages of the first and second liquid crystal capacitors Clca and Clcb are controlled, the image shown at the side may be approximate to the image shown at the front, thereby improving the side visibility.

The liquid crystal panel PN according to an exemplary embodiment of the present invention includes the liquid crystal layer interposed between two display substrate 100 and 200. The liquid crystal layer is aligned to have a pretilt.

Figure 5:
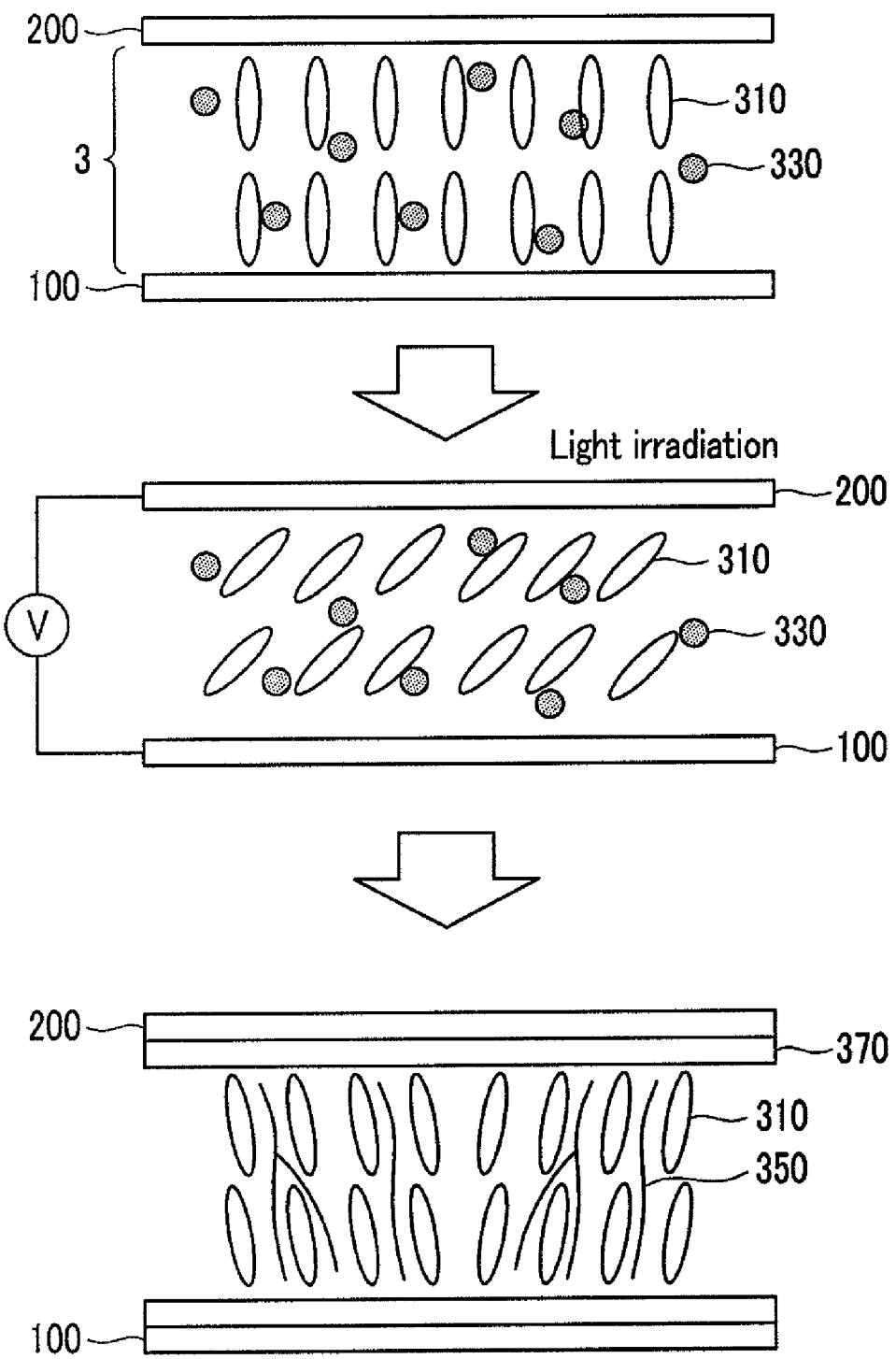
FIG. 5 is a view showing a process for providing a pretilt to liquid crystal molecules by using prepolymers that are polymerized by light.

A method in which the liquid crystal molecules of the liquid crystal layer are initially aligned to have the pretilt is described with reference FIG. 5. FIG. 5 is a view showing a process for providing a pretilt to liquid crystal molecules by using prepolymers that are polymerized by light, such as, for example, ultraviolet rays.

Prepolymers 330 are injected along with a liquid crystal material between two display substrates 100 and 200. In an exemplary embodiment, the prepolymers 330 can be a monomer, and the monomer can be polymerized by ultraviolet rays. The prepolymer 330 may be a reactive mesogen that is polymerized by light such as, for example, ultraviolet rays.

The gate lines and the data lines are formed on the thin film transistor array substrate 100. The voltages are applied to the gate lines and the data lines to apply the data voltage to the first and second subpixel electrodes. A common voltage is applied to the upper substrate 200, thereby forming the electric field to the liquid crystal layer 3 between the two display substrates 100 and 200.

In response to the electric field, liquid crystal molecules 310 of the liquid crystal layer 3 are tilted in the direction parallel to the length direction of the minute branches 194a-194d through two steps. The inclined directions of the liquid crystal molecules 310 in a pixel PX are four directions.

Referring to FIG. 5, after generating the electric field to the liquid crystal layer 3 when the light such as ultraviolet rays is irradiated, the prepolymers 330 are polymerized to form first polymers 350 and second polymers 370.

The first polymers 350 are formed in the liquid crystal layer 3, and the second polymers 370 are formed while contacting the display substrates 100 and 200. The alignment directions of the liquid crystal molecules 310 are determined to have the pretilt in the length direction of the minute branches 194a-194d by the first and second polymers 350 and 370.

Accordingly, even when the voltage is not applied to the electrodes 191 and 270, the liquid crystal molecules 310 are arranged with the pretilt of the different four directions.

The liquid crystal layer 3 of the liquid crystal panel according to an exemplary embodiment of the present invention is initially aligned through the irradiation of the light with the application of the voltage to the two display substrates 100 and 200. According to a method of manufacturing a display panel according to an exemplary embodiment of the present invention, the voltage application to the two display substrates 100 and 200 for the initial alignment is not executed as a unit of each liquid crystal panel PN. The voltage application is executed as a unit of the display panel including a plurality of liquid crystal panels PN.

A method of manufacturing a display panel including liquid crystal panels for a liquid crystal display is described with reference to FIG. 1 and FIG. 6 to FIG. 10. FIG. 6 to FIG. 10 are views sequentially showing a method of manufacturing a display panel according to an exemplary embodiment of the present invention. In FIG. 6 to FIG. 10, only one liquid crystal panel PN is shown. However according to an exemplary embodiment of the present invention, a plurality of liquid crystal panels can be formed using the method.

Figure 6:
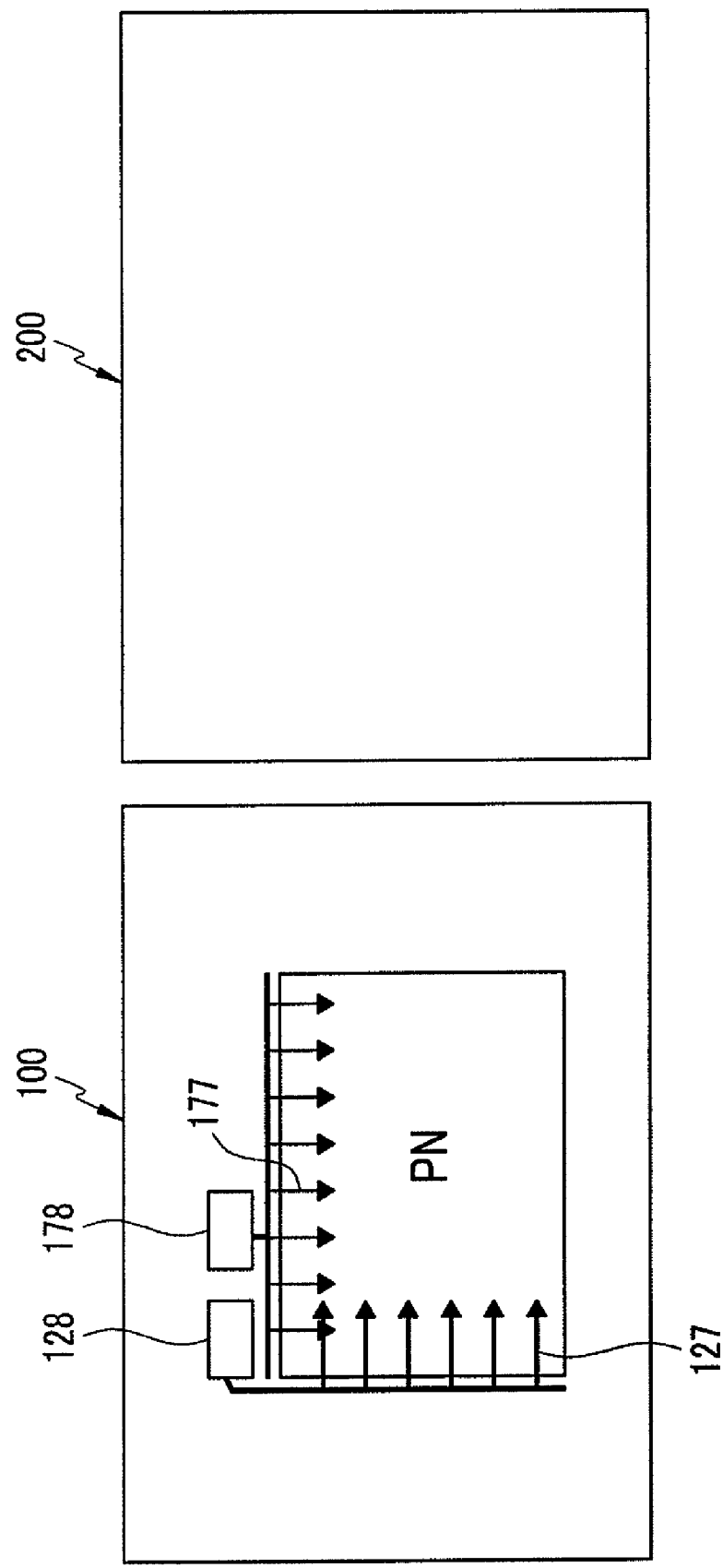

Referring to FIG. 6, a thin film transistor array substrate 100 includes a plurality of pixels, test signal lines 127 and 177, and test pads 128 and 178, and a common electrode substrate 200 including a common electrode formed on the whole surface.

Figure 7:
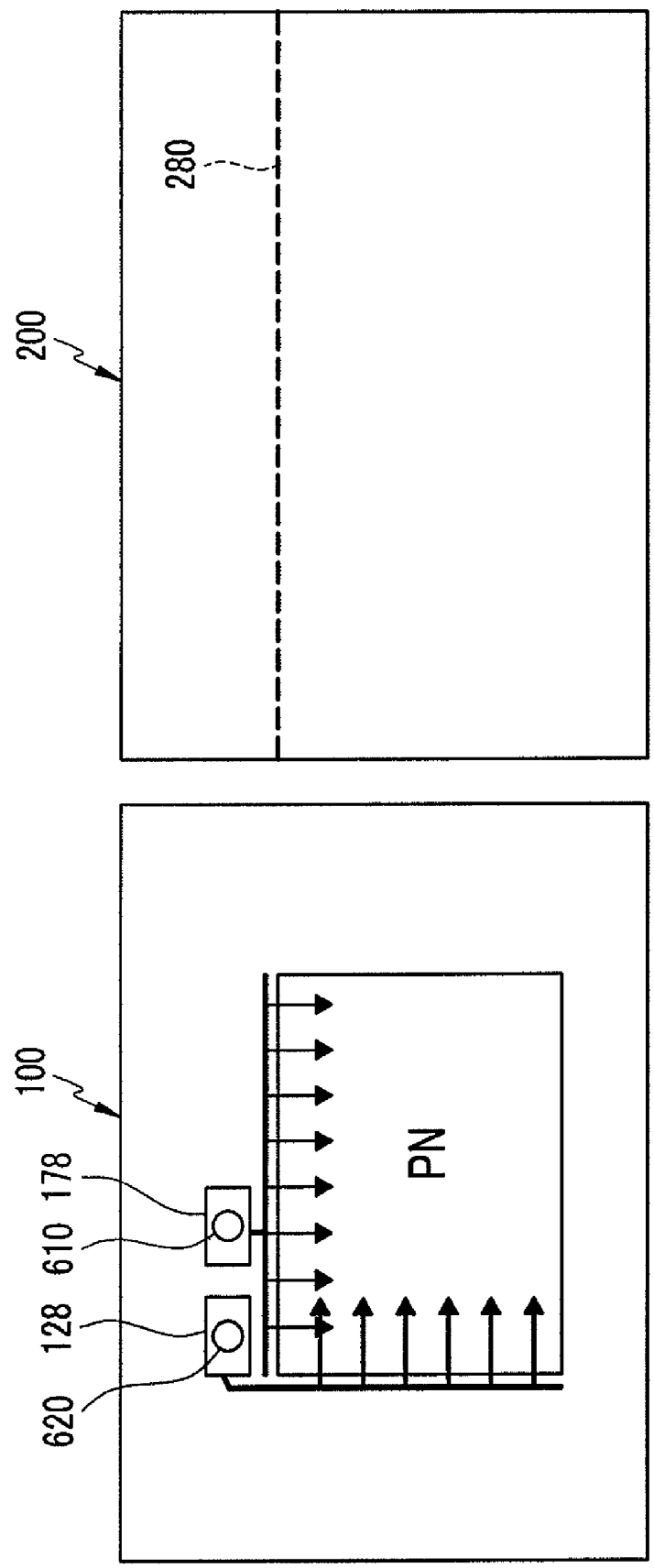

Referring to FIG. 7, short points 620 and 610 are formed on the test pads 128 and 178 of the thin film transistor array substrate 100, and a region division line 280 is formed in the common electrode substrate 200 by using, for example, a laser. In an exemplary embodiment, the short points 620 and 610 may be disposed at positions on the common electrode substrate 200 corresponding to the test pads 128 and 178 of the thin film transistor array substrate 100.

Referring to FIG. 8, a sealant 320 is printed on the circumference of each liquid crystal panel PN of one of the thin film transistor array substrate 100 and the common electrode substrate 200. The sealant 320 is respectively disposed for each liquid crystal panel PN in a closed line. A liquid crystal material is inserted in the region enclosed by the sealant 320. The two display substrates 100 and 200 are aligned and uniformly pressed to attach the two display substrates 100 and 200 together.

Referring to FIG. 9, the edge L of the thin film transistor array substrate 100 is removed to expose the edge of the common electrode substrate 200.

Figure 10:
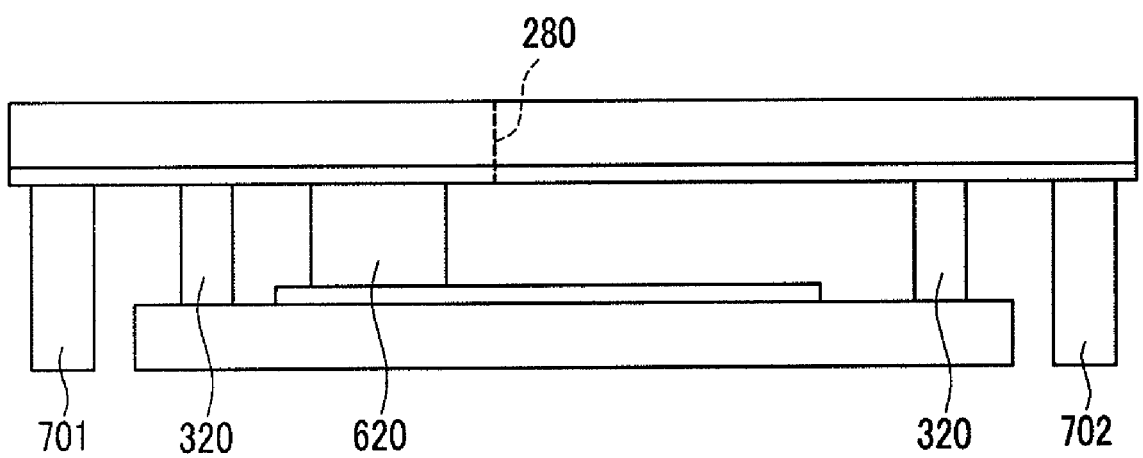

Referring to FIG. 10, a signal is applied to the voltage application portions 701 and 702 on the edge of the common electrode substrate 200 to apply a voltage to the two display substrates 100 and 200.

Referring to FIG. 1 and FIG. 10, the common electrode substrate 200 has a plurality of regions a and b that are electrically insulated from each other by the region division line 280. The region a where the voltage application portion 701 is formed and the region b where the voltage application portion 702 is formed are divided by the region division line 280 of FIG. 1 and FIG. 10.

The voltage applied through the voltage application portion 701 is passed by the common electrode substrate 200, is transmitted to the test pads 128 and 178 of the thin film transistor array substrate 100 through the short points 610 and 620, and is applied to the gate lines and the data lines through the test signal lines 127 and 177 to be transmitted to the pixel electrode of each pixel. In an exemplary embodiment, the voltage is simultaneously applied to the test pads 128 and 178 and the test signal lines 127 and 177 of the plurality of liquid crystal panels. Thus, the pixels of the plurality of liquid crystal panels are simultaneously applied with the same voltage.

In an exemplary embodiment, the voltage applied through the voltage application portion 702 is applied to the common electrode of the common electrode substrate 200, and the voltage is also simultaneously applied to the common electrodes of the plurality of liquid crystal panels formed in the region b.

Thus, the pixel electrodes and the common electrodes of the plurality of liquid crystal panels PN may be simultaneously applied with the voltage by applying the voltage, for example, only to the voltage application portions 701 and 702.

In an exemplary embodiment of the present invention, each of the voltage application portions 701 and 702 is formed one by one for the regions that are insulated from each other by the region division line 280. In an exemplary embodiment, a plurality of voltage application portions to apply the voltage may be formed per region when considering the resistance of the signal lines. For example, an additional voltage application portion may be formed on the lower edge of the display panel of FIG. 1.

The plurality of liquid crystal panels are simultaneously applied with the voltage to generate the electric field to the liquid crystal layer between the two display substrates 100 and 200. The light such as ultraviolet rays is irradiated such that the plurality of liquid crystal panels are simultaneously initially aligned.

The voltage applied to the voltage application portion 701 is passed by the common electrode substrate 200 and applied to the thin film transistor array substrate 100 through the short points 620 and 610 formed in the test pads 128 and 178. The voltage applied to the voltage application portion 702 is applied only to the common electrode substrate 200 such that the voltage having the desired magnitude may be applied to the two display substrates 100 and 200.

The voltage application portions 701 and 702 are formed on the desired positions. The plurality of liquid crystal panels PN are simultaneously applied with the voltage such that the plurality of liquid crystal panels PN may be simultaneously initially aligned, thereby reducing the manufacturing time and cost.

Figure 11:
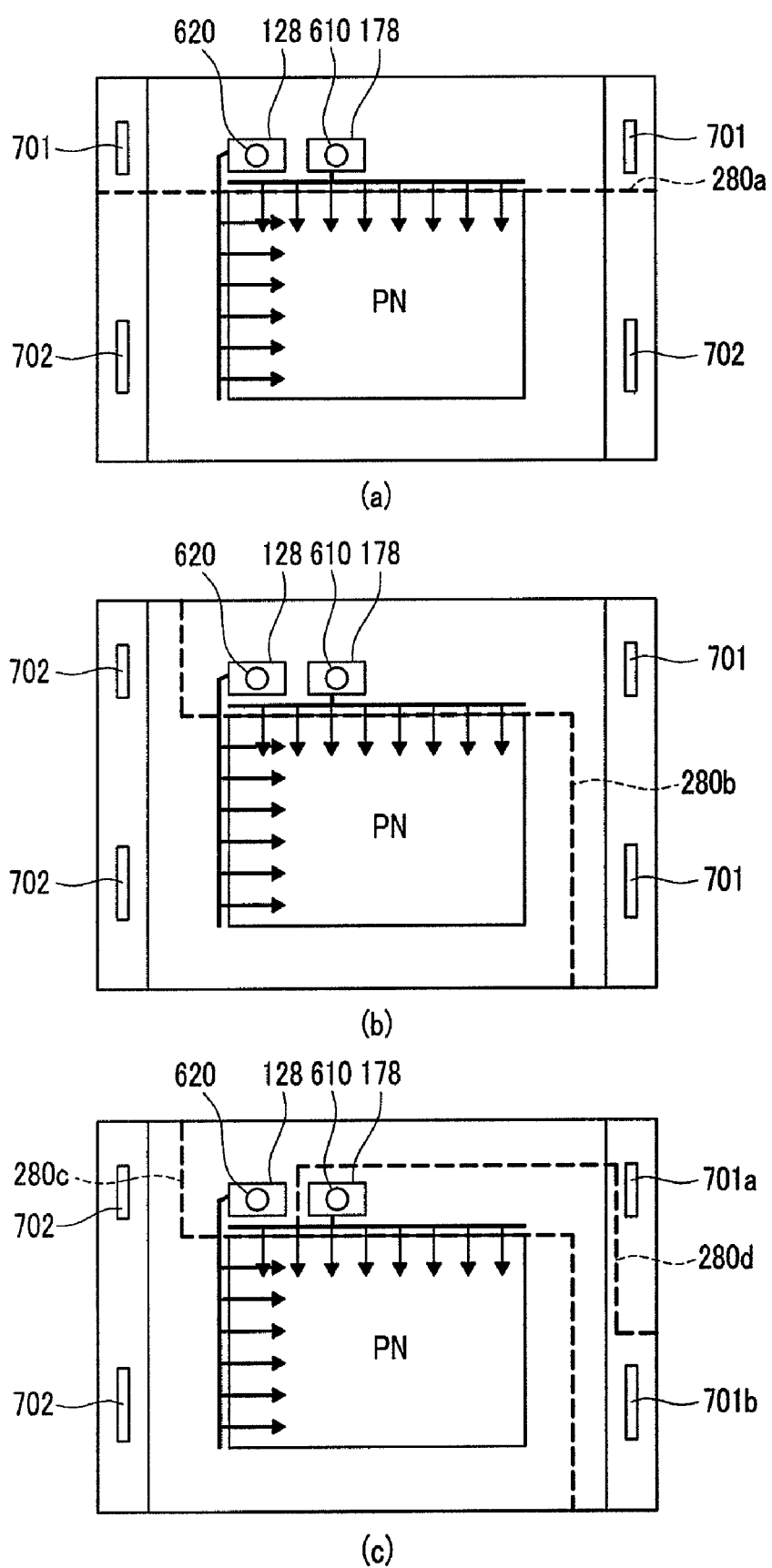
FIG. 11 is a schematic view showing various examples for defining regions of a display panel in an application method of a voltage according to an exemplary embodiment of the present invention.

Referring to FIG. 11, a method for defining a voltage application region according to an exemplary embodiment of the present invention is described. FIG. 11 is a schematic view showing various examples for defining regions of the display panel in the voltage application method.

Referring to FIG. 11(a), a region division line 280a is formed to divide the upper and lower portions of the display panel. Thus, the voltage applied through the signal application portion 701 formed on the upper portion of the display panel is applied to the thin film transistor array substrate 100 through a short point formed in the test pads 128 and 178. The voltage applied through the signal application portion 702 formed on the lower portion of the display panel is directly applied to the common electrode to thereby be applied to the common electrode substrate 200.

Referring to FIG. 11(b), according to the region divided by the region division line 280b, the voltage applied through the signal application portion 701 formed on the right portion of the display panel is applied to the thin film transistor array substrate 100 through the short point formed on the test pads 128 and 178. The voltage applied through the signal application portion 702 formed on the left portion of the display panel is directly applied to the common electrode, thereby being applied to the common electrode substrate 200.

Referring to FIG. 11(c), one liquid crystal panel of the display panel is divided into three regions by a plurality of region division lines 280c and 280d. The voltage applied through the signal application portion 701a formed on the right-upper portion of the display panel among the regions divided by the region division 280c and 280d is applied to the gate lines of the liquid crystal panel through the test pad 128. The test pad 128 is connected to the test gate line. The voltage applied through the signal application portion 701b formed on the right-lower portion of the display panel is applied to the data lines of the liquid crystal panel through the pad 178 connected to the data line. The voltage applied through the signal application portions 702 formed on the left portion of the display panel is directly applied to the common electrode, thereby applied to the common electrode substrate 200.

When applying the division method shown in FIG. 11(c), the gate lines and the data lines of the thin film transistor array substrate 100 may be applied with different voltages.

According to a method of manufacturing the display panel of an exemplary embodiment of the present invention, the various division lines are formed to divide the plurality of regions and the voltage of the desired multitude is applied to each region. Thus, the voltage having the desired magnitude may be applied according to the signal lines for the liquid crystal panel. Different voltages may be applied to the various regions according to different region division methods using the laser. Desired voltages may be applied to the plurality of liquid crystal panels according to exemplary embodiments of the present invention.

The region division methods shown in FIG. 11(a) to FIG. 11(c) are examples according to exemplary embodiments of the present invention. The regions may be variously divided according to different voltage application methods.

According to an exemplary embodiment of the present invention, when initially aligning the liquid crystal, a desired voltage may be applied to the thin film transistor array substrate and the common electrode substrate as a unit of the display panel including the plurality of liquid crystal panels. The initial alignment processes are simultaneously executed such that the manufacturing time and cost may be reduced. The desired voltages can be separately applied to each liquid crystal panel according to a region division method of an exemplary embodiment of the present invention.

Although the exemplary embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method of manufacturing a display panel, the method comprising:
    forming a first display substrate including a plurality of pixel electrodes, a plurality of test signal lines, and a plurality of test pads;
    forming a second display substrate including a common electrode;
    forming a short point on at least one of the test pads;
    dividing the common electrode into a plurality of regions insulated from each other;
    aligning and attaching the first display substrate and the second display substrate to each other;
    removing an edge portion of the first display substrate to expose an edge portion of the second display substrate;
    applying a first voltage to the first display substrate and the second display substrate in a first region of the plurality of regions through a first voltage application portion on the exposed edge portion of the second display substrate, wherein the first voltage application portion is connected to a first portion of the common electrode, and the first voltage is applied to the first display substrate through the first portion of the common electrode, the short point and the at least one of the test pads; and
    applying a second voltage to the second display substrate in a second region of the plurality of regions insulated from the first region, through a second voltage application portion on the exposed edge portion of the second display substrate, wherein the second voltage application portion is connected to a second portion of the common electrode insulated from the first portion, and the second voltage is not applied to the first display substrate.

2. The method of claim 1, wherein the short point electrically connects the first display substrate and the second display substrate to each other, and the short point is formed in the first display substrate.

3. The method of claim 1, wherein the short point electrically connects the first display substrate and the second display substrate to each other, and the short point is formed in the second display substrate.

4. The method of claim 1, wherein dividing the common electrode into a plurality of regions insulated from each other uses a laser.

5. The method of claim 1, wherein the voltage applied to the short point is applied to a test signal line through the test pad.

6. The method of claim 1, wherein the first voltage and the second voltage are applied to the second display substrate through a probe.

7. The method of claim 6, wherein the first voltage and the second voltage are directly applied to the common electrode.

* * * * *